United States Patent
Hou

(10) Patent No.: US 10,976,440 B2
(45) Date of Patent: Apr. 13, 2021

(54) METHOD OF POSITIONING A DEVICE, POSITIONING DEVICE AND NON-TRANSITORY COMPUTER READABLE MEDIUM

(71) Applicant: Realtek Semiconductor Corporation, Hsinchu (TW)

(72) Inventor: Kun-Sui Hou, Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 267 days.

(21) Appl. No.: 16/174,440

(22) Filed: Oct. 30, 2018

(65) Prior Publication Data
US 2020/0041655 A1    Feb. 6, 2020

(30) Foreign Application Priority Data
Aug. 3, 2018    (TW) .................. 107127155

(51) Int. Cl.
G01S 19/20    (2010.01)
G01S 19/40    (2010.01)
G01S 19/28    (2010.01)

(52) U.S. Cl.
CPC .............. G01S 19/20 (2013.01); G01S 19/28 (2013.01); G01S 19/40 (2013.01)

(58) Field of Classification Search
CPC .......... G01S 19/20; G01S 19/23; G01S 19/28; G01S 19/40
See application file for complete search history.

(56) References Cited

U.S. PATENT DOCUMENTS

| | | | | |
|---|---|---|---|---|
| 5,841,399 A | * | 11/1998 | Yu | G01S 19/20 342/357.29 |
| 5,931,889 A | * | 8/1999 | Misra | G01S 19/20 342/358 |
| 6,185,427 B1 | * | 2/2001 | Krasner | G01S 5/0036 455/456.2 |
| 2012/0050096 A1 | * | 3/2012 | Cheng | G01S 19/423 342/357.25 |

FOREIGN PATENT DOCUMENTS

| CN | 108089210 A | * | 5/2018 |
|---|---|---|---|
| TW | I387773 B | | 3/2013 |

OTHER PUBLICATIONS

English Translation of CN 108089210 A (Year: 2020).*

* cited by examiner

*Primary Examiner* — Bernarr E Gregory
*Assistant Examiner* — Fred H Mull
(74) *Attorney, Agent, or Firm* — Locke Lord LLP; Tim Tingkang Xia, Esq.

(57) ABSTRACT

A method of positioning a device includes: receiving satellite signals corresponding to at least 5 satellites in a global navigation satellite system (GNSS); determining whether there is one of the satellite signals has a wrong bit edge from at least navigation data of the satellite signals; and in response to a determination that there is one of the satellite signals has a wrong bit edge, finding out a wrong satellite signal among the satellite signals, and using the navigation data of the other satellite signals to obtain a position of the device.

17 Claims, 5 Drawing Sheets

METHOD OF POSITIONING A DEVICE, POSITIONING DEVICE AND NON-TRANSITORY COMPUTER READABLE MEDIUM

RELATED APPLICATIONS

This application claims priority to Taiwan Application Serial Number 107127155, filed on Aug. 3, 2018, which is herein incorporated by reference.

BACKGROUND

Field of Disclosure

The present disclosure relates to a positioning technical field, and more particularly, to a method of positioning a device, a positioning device and a non-transitory computer readable medium.

Description of Related Art

A global navigation satellite system (GNSS) is a satellite-based system which provides navigation data for a receiving terminal to obtain location information (e.g. longitude, latitude and altitude information) relative to the earth. On the other hand, in response to user needs, many electronic products, such as mobile phones, car navigation devices, smartwatches and cameras, are all equipped with a positioning function, such that users can obtain location information, and service providers can immediately provide location-based services based on users' location information. However, wrong positioning information would be obtained due to a bit synchronization error of navigation data under such as a weak satellite signal environment.

Conventionally, a fault detection and exclusion algorithm can be used to solve the abovementioned positioning problem when there are more than 5 valid satellite signals for positioning. However, no feasible solution for the above mentioned positioning problem has been proposed up to the present under a condition where there are only 5 valid satellite signals for positioning.

SUMMARY

A major objective of the present disclosure is to provide a mechanism for determining a wrong satellite signal from received satellite signals. In this mechanism, after determining that one of the acquired satellite signals has a wrong bit edge, the navigation data of the satellite signal with a wrong bit edge may be ignored, and the navigation data of the other satellite signals are used to perform actual positioning coordinate calculation. Because the satellite signal with a wrong bit edge is ensured not to be involved in calculating the actual positioning coordinate of the device, the device can be correctly and accurately positioned.

An aspect of the present disclosure is a method of positioning a device. The method includes: receiving satellite signals corresponding to at least 5 satellites in a global navigation satellite system (GNSS); determining whether there is one of the satellite signals has a wrong bit edge from at least navigation data of the satellite signals; and in response to a determination that there is one of the satellite signals has a wrong bit edge, finding a wrong satellite signal among the satellite signals, and using the navigation data of the other satellite signals to obtain a position of the device.

Another aspect of the present disclosure is a positioning device. The positioning device includes a front-end circuit and a processor. The front-end circuit is configured to receive satellite signals corresponding to at least 5 satellites in a GNSS. The processor configured to perform the following operations: determining whether there is one of the satellite signals has a wrong bit edge from at least navigation data of the satellite signals; in response to a determination that there is one of the satellite signals has a wrong bit edge, finding a wrong satellite signal among the satellite signals, and using the navigation data of the other satellite signals to obtain a position of the device.

Another aspect of the present disclosure is a non-transitory computer readable medium which stores computer program instructions that, when executed by a processor, cause the processor to perform the following operations for positioning of a device: obtaining navigation data of the satellite signals in a GNSS respectively from satellite signals of the satellites; determining whether any of the satellite signals has a wrong bit edge from at least the navigation data; and in response to a determination that one of the satellite signals is received with a wrong bit edge, finding a wrong satellite signal among the satellite signals, and using the navigation data of the other satellite signals to obtain a position of the device.

BRIEF DESCRIPTION OF THE DRAWINGS

The foregoing aspects and many of the accompanying advantages of this disclosure will become more readily appreciated as the same disclosure becomes better understood by reference to the following detailed description, when taken in conjunction with the accompanying drawings.

DETAILED DESCRIPTION

The detailed explanation of the present disclosure is described as following. The described preferred embodiments are presented for purposes of illustrations and description, and they are not intended to limit the scope of the present disclosure.

In the following description, the term "coupled" may be used to indicate that two or more elements are in direct physical or electrical contact with each other, or may also mean that two or more elements may not be in direct contact with each other. "Coupled" may still be used to indicate that two or more elements cooperate or interact with each other.

It will be understood that, although the terms "$1^{st}$," "$2^{nd}$," etc. may be used herein to describe various signals and/or entitles, these signals and/or entities should not be limited by these terms. These terms are only used to distinguish signals and/or entities.

Methods described in the present disclosure may be implemented by various means, such as hardware, software, firmware, or combinations thereof. For hardware-implemented methods, there methods may be implemented with one or more general purpose processor, a central processing unit (CPU), a microprocessor, a digital signal processor (DSP), an application specific integrated circuit (ASIC), a field programmable gate array (FPGA) or other programmable logic device, controller, microcontroller, specific hardware components, or any combination thereof.

Figure 1:
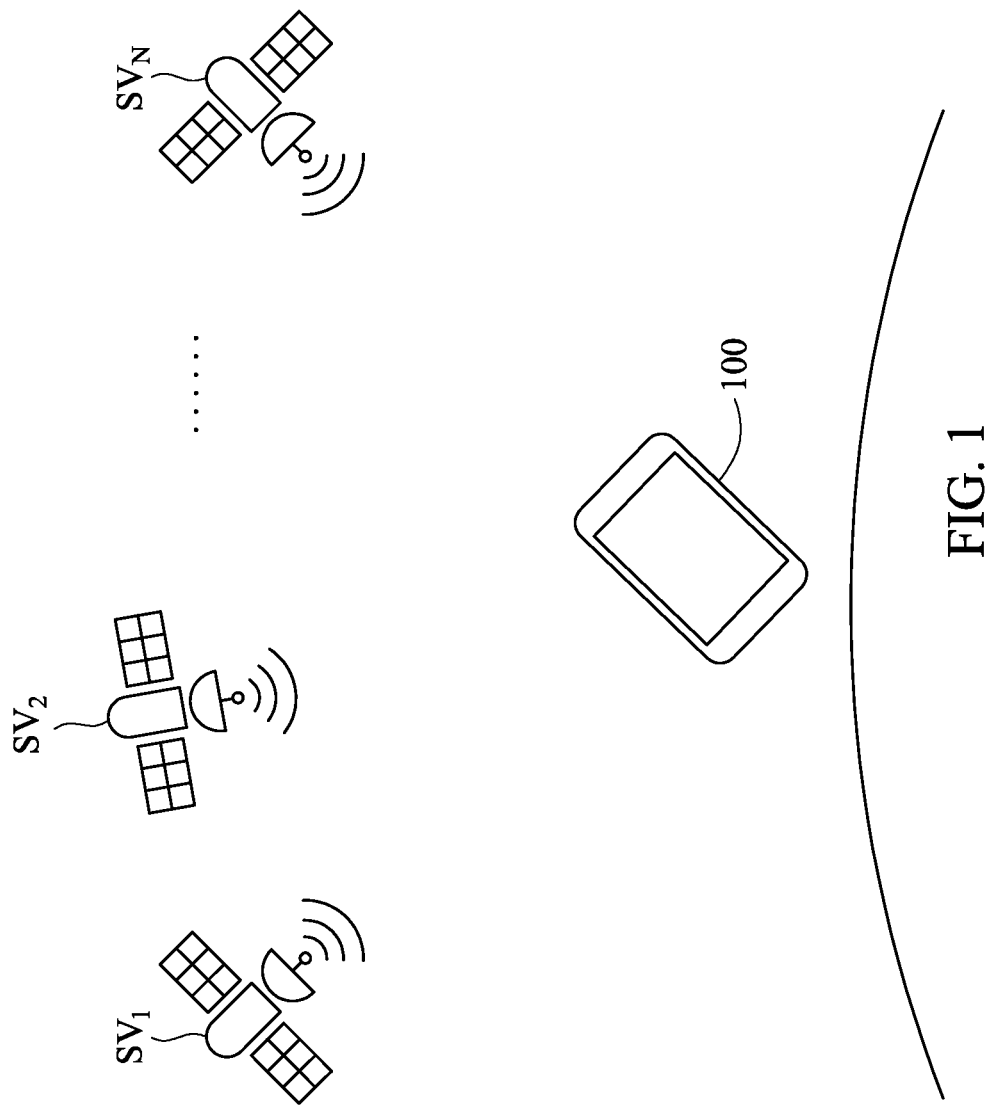
FIG. 1 is a positioning device and satellites in a global navigation satellite system (GNSS) in accordance with some embodiments of the present disclosure.

FIG. 1 is a positioning device 100 and satellites $SV_1$-$SV_N$ in a global navigation satellite system (GNSS) in accordance with some embodiments of the present disclosure. The GNSS is a satellite-based system, which may be the Global Positioning System (GPS), the GLONASS system, the Galileo Positioning System, the BeiDou Navigation Satellite System, the Quasi-Zenith Satellite System (QZSS), the Indian Regional Navigation Satellite System (IRNSS) or another system capable of providing satellite signals for the positioning device 100.

The positioning device 100 may acquire the satellite signals directly and/or indirectly from the GNSS and then perform a positioning process based on the satellite signals to obtain its positioning coordinate. In some embodiments, the positioning device 100 is a GNSS receiver which receives satellite signals from the satellites visible thereto and then calculates its positioning coordinate on navigation data acquired from the received satellite signals. For example, if there are 6 visible satellites visible to the positioning device 100, then the positioning device 100 uses the navigation data of these 6 satellite signals to calculate its positioning coordinate.

The positioning device 100 may be software-based, hardware-based or both, depending on various implementations. For example, the positioning device 110 may be a mobile entity such as a mobile phone, a tablet computer, a vehicle recorder and a smartwatch, or a module of the mobile device described above, or a non-transitory computer readable medium that stores computer program instructions executed by a processor.

Figure 2:
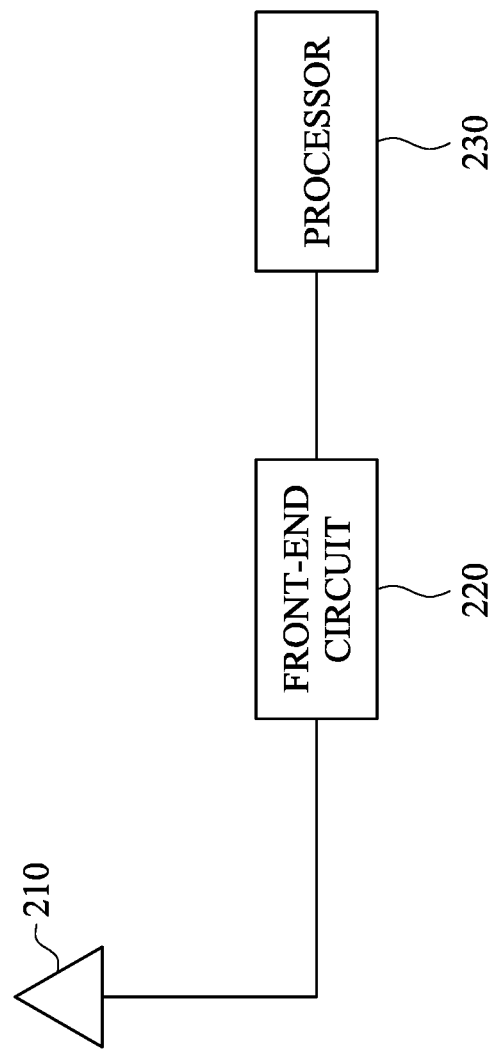
FIG. 2 is a schematic diagram of a positioning device in accordance with some embodiments of the present disclosure.

FIG. 2 is a schematic diagram of a positioning device 200 in accordance with some embodiments of the present disclosure. The positioning device 200 may be an implementation of the positioning device 100 in FIG. 1 or another entity or module for positioning. The positioning device 200 is configured to receive satellite signals from a GNSS and perform a positioning operation based on the received satellite signals, and therefore it may be also referred to as a GNSS receiver.

The positioning device 200 is hardware-based and includes an antenna 210, a front-end circuit 220 and a processor 230. The antenna 210 is configured to receive analog form satellite signals. The receiving frequency band of the antenna 210 is associated with the type, the structure, the size, the pattern and/or another factor thereof. For GPS, the type, the structure, the size and the pattern of the antenna 210 may be designed to have its receiving frequency band centered at the frequency of 1575.42 MHz (the center frequency of the L1 band), 1227.60 MHz (the center frequency of the L2 band) or 1176.45 MHz (the center frequency of the L5 band). The front-end circuit 220 converts the satellite signals into digital form for the processor 230 to acquire (i.e. extract and decode) navigation data from the satellite signals. The front-end circuit 220 may further include elements such as a low noise amplifier (LNA) for amplifying the satellite signals, a frequency down converter for down-converting the satellite signals from radio frequency (RF) to intermediate frequency (IF), and an analog-to-digital (ND) converter for performing analog-to-digital conversion on the satellite signals. The front-end circuit 220 may transmit the satellite signals to the processor 230 through a wired interface or a network.

The processor 230 is configured to acquire navigation data from the satellite signals, track the satellite signals, and perform operations on the navigation data, so as to obtain the position (i.e. positioning coordinate) of the positioning device 200. In other embodiments, navigation data acquisition, satellite signals tracking and operations on the navigation data may be performed by different processors or modules.

Figure 3:
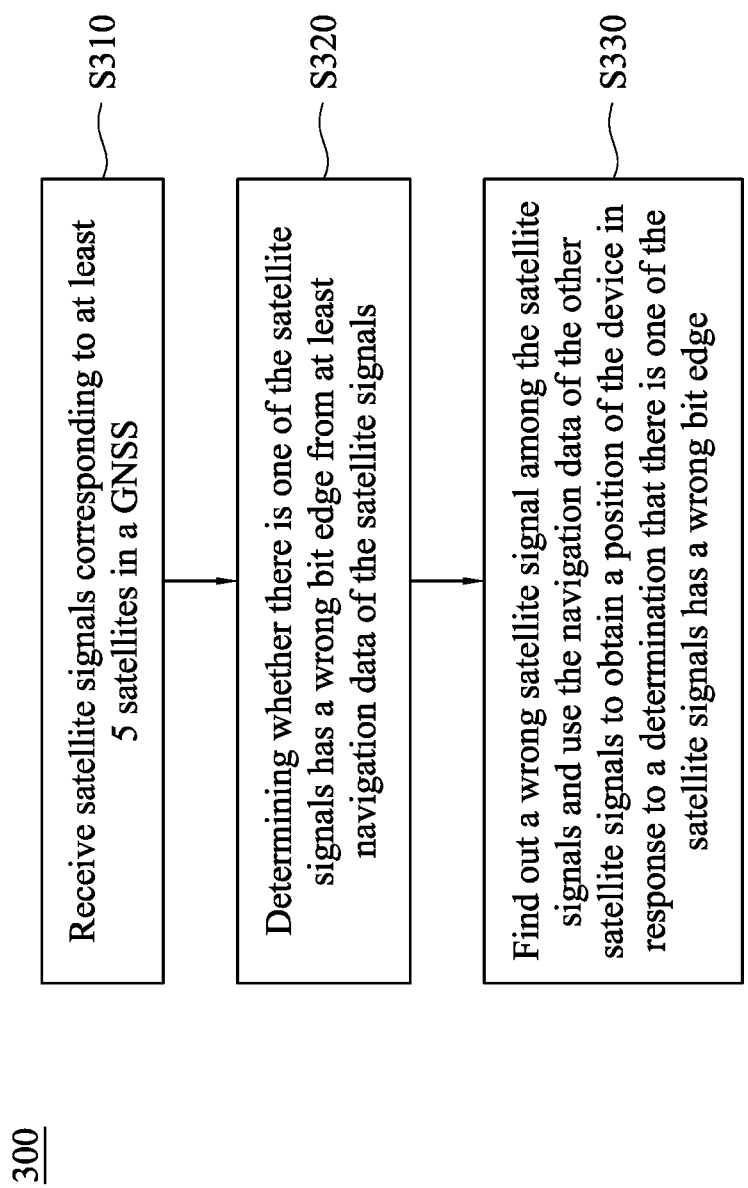
FIG. 3 is a flowchart illustrating a method of positioning a device in accordance with some embodiments of the present disclosure.

FIG. 3 is a flowchart illustrating a method 300 of positioning a device in accordance with some embodiments of the present disclosure. In the descriptions of all steps of the method 300, the device may be the positioning device 100 in FIG. 1, the positioning device 200 in FIG. 2, or any other electronic device capable of receiving satellite signals broadcasted from the satellites of the GNSS, and the processes on the navigation data may be performed on the device or another entity that has data processing ability (e.g. a computer or a server) and is connected to (e.g. coupling, communicatively connected or another direct or indirect connection method) the device. For example, if the method 300 is performed in the positioning device 200, the antenna 210 is configured to receive satellite signals, the front-end circuit 220 is configured to convert the satellite signals into digital form, and then the processor 230 is configured to acquire navigation data from the satellite signals and performs operations on the navigation data.

The method 300 begins at Step S310, in which the device receives satellite signals in a GNSS. The device may acquire navigation data from the satellite signal if the strength of the received satellite signal is at least the receiving sensitivity of the device.

When the device acquires navigation data from 5 or more satellite signals, the method 300 proceeds to Step S320 to determine whether there is one of the satellite signals has a wrong bit edge from at least navigation data of the satellite signals. In certain embodiments, for a warm start case, the device may further use valid data such as recently decoded almanac data and coordinated universal time (UTC) time to determine whether there is one of the acquired satellite signals has a wrong bit edge.

Figure 4:
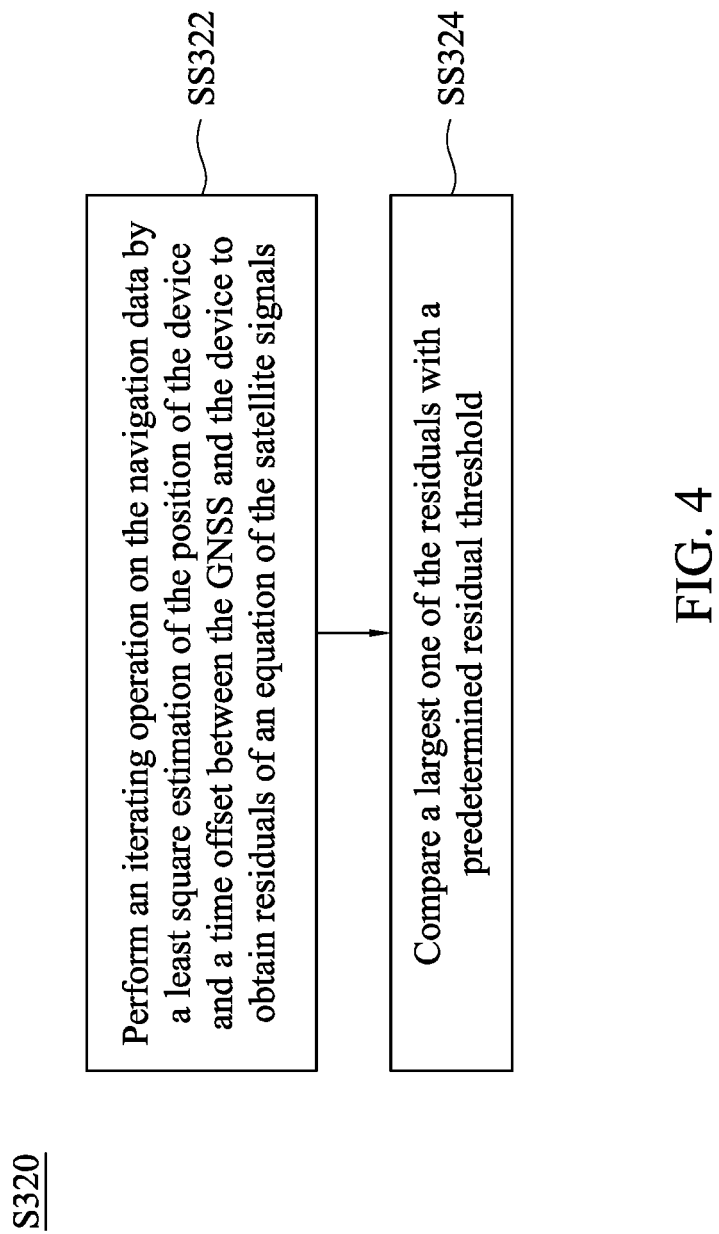
FIG. 4 is a flowchart of a step of the method in FIG. 3.

In some embodiment, as shown in FIG. 4, determining whether there is one of the acquired satellite signals has a wrong bit edge in Step S320 includes Substeps SS322 and SS324. In Substep SS322, the device performs an iterative operation on the navigation data by a least square estimation of the position of the device and a time offset between the GNSS and the device to obtain residuals of the satellite signals. For the convenience of description, in the following embodiments, there are M satellite signals respectively from M satellites in the GNSS (M≥5) acquired by the device, and these M satellites are respectively referred to as $1^{st}$ to $M^{th}$ satellites. It is noted that the aforementioned satellite sequences are not meant to represent the satellite number in the GNSS. The pseudo range for the $m^{th}$ satellite (m is an integer in a range from 1 to M) is $$PR[m]=\rho[m]+cdt-ctb[m], \quad (1)$$

Where $\rho[m]=\sqrt{(x-S_x[m])^2+(y-S_y[m])^2+(z-S_z[m])^2}$ is the geometrical range between the $m^{th}$ satellite and the device, (x,y,z) is the three-dimensional positioning coordinate of the device, $(S_x[m],S_y[m],S_z[m])$ is the three-dimensional positioning coordinate of the $m^{th}$ satellite, c is the speed of light, dt is the time offset between the GNSS and the device, and tb[m] is a pseudorandom noise (PRN) code phase time offset of the $m^{th}$ satellite.

Taking GPS for example, a GPS message contains 5 subframes each having 300 bits. In the GPS, all satellites are synchronized with gpstime. In addition, all GPS satellites transmit the first bit of the first subframe at the same time, and such time is attached in the time of week (TOW) count of the first subframe. Each bit in the first subframe occupies 20 milliseconds, i.e., the $x^{th}$ bit in the first subframe is transmitted at TOW+x*20 ms. At the GPS receiving terminal, by recording the receiving time of the $x^{th}$ bit of the $m^{th}$ satellite's GPS message and obtaining when such bit is transmitted by the $m^{th}$ satellite from the GPS message, the travelling time of the satellite signal from the GPS satellite to the GPS receiving terminal can be calculated, and thus the pseudo range PR[m] is obtained.

By linearizing Equation (1) and then taking an iterative operation, the first-order linearized equation for the $m^{th}$ satellite at the $(i+1)^{th}$ step of the iterative operation becomes $$PR[m] = \rho[m]_i - \frac{x_i - S_x[m]}{\rho[m]_i}\Delta x_i - \frac{y_i - S_y[m]}{\rho[m]_i}\Delta y_i - \frac{z_i - S_z[m]}{\rho[m]_i}\Delta z_i - ctb[m] + c\Delta dt_i,$$

where $\rho[m]_i = \sqrt{(x_i - S_x[m])^2 + (y_i - S_y[m])^2 + (z_i - S_z[m])^2}$, $(x_i, y_i, z_i)$ is a position estimation of the device at the $i^{th}$ step of the iterative operation, $\Delta x_i = x_{i+1} - x_i$, $\Delta y_i = y_{i+1} - y_i$, $\Delta z_i = z_{i+1} - z_i$, $\Delta dt_i = dt_{i+1} - dt_i$, and $x_0$, $y_0$, $z_0$ and $dt_0$ are initial estimation values before the iterative operation. For a cold start case, the initial estimation values $x_0$, $y_0$, $z_0$ and $dt_0$ may be set to be all zero. Oppositely, in a warm start case, the initial estimation values $x_0$, $y_0$, $z_0$ and $dt_0$ may be set according to the latest positioning operation, in order to accelerate the current positioning operation.

The least square estimation of the position of the device and the time offset between the GNSS and the device may be obtained from the equation in a matrix form Ha=b, where the $M^{th}$ row (corresponding to the $M^{th}$ satellite) of the matrix H at the $(i+1)^{th}$ step of the iterative operation is $$\left[ -\frac{x_i - S_x[m]}{\rho[m]_i} \quad -\frac{y_i - S_y[m]}{\rho[m]_i} \quad -\frac{z_i - S_z[m]}{\rho[m]_i} \quad 1 \right],$$

the $m^{th}$ row of the matrix b at the $(i+1)^{th}$ step of the iterative operation is $PR[m]+ctb[m]-\rho[m]_i$, and the matrix a at the $(i+1)^{th}$ step of the iterative operation is $a_i = [\Delta x_i \; \Delta y_i \; \Delta z_i \; c\Delta dt_i]^T$. In a case where M≥4, the least square estimation of the equation Ha=b at the $(i+1)^{th}$ step of the iterative operation gives a unique solution $(\Delta x_i, \Delta y_i, \Delta z_i, c\Delta dt_i)$, and the estimation values at the $(i+1)^{th}$ step of the iterative operation is $(x_{i+1},y_{i+1},z_{i+1},cdt_{i+1})=(x_i,y_i,z_i,cdt_i)+(\Delta x_i,\Delta y_i,\Delta z_i,c\Delta dt_i)$. The intermediate residual of the $m^{th}$ satellite at the $(i+1)^{th}$ step of the iterative operation is $h_m a_i - (PR[m]+ctb[m]-\rho[m]_i)$ where $$h_m = \left[ -\frac{x_i - S_x[m]}{\rho[m]_i} \quad -\frac{y_i - S_y[m]}{\rho[m]_i} \quad -\frac{z_i - S_z[m]}{\rho[m]_i} \quad 1 \right].$$

The iterative operation stops at the $K^{th}$ step of the iterative operation if the sum of the intermediate residuals of the $1^{st}$ to $M^{th}$ satellites at the $K^{th}$ iteration is smaller than a predetermined intermediate residual threshold. The predetermined intermediate residual threshold may be set according to, for example, specification requirements. In certain embodiments, the predetermined intermediate residual threshold may be set to $10^{-3}$ for positioning accuracy and fast positioning concerns.

After the iterative operation (i.e. after the $K^{th}$ step of the iterative operation) on the navigation data, the estimation $(x_K,y_K,z_K,cdt_K)$ is obtained, and the final residual R[m] of the $m^{th}$ satellite is given by $$R[m]=|PR[m]-\rho[m]_K-cdt_K+ctb[m]|.$$

After obtaining the residuals R[1]-R[M] of the $1^{st}$ to $M^{th}$ satellites, Substep SS324 is then performed, in which the largest one among the residuals R[1]-R[M] (which is defined as a maximum residual RS_MAX) is compared with a predetermined residual threshold. If the maximum residual RS_MAX is greater than the predetermined residual threshold, the device determines that there is a wrong bit edge in one of the satellite signals. In certain embodiments, the predetermined residual threshold may be set to 8000 meters according to, for example, specification requirements.

Once determining that there is a wrong bit edge within one of the satellite signals, the method 300 proceeds to Step S330 to find out a wrong satellite signal among the satellite signals and to use the navigation data of the other satellite signals (excluding the wrong satellite signal) to obtain a position of the device.

Figure 5:
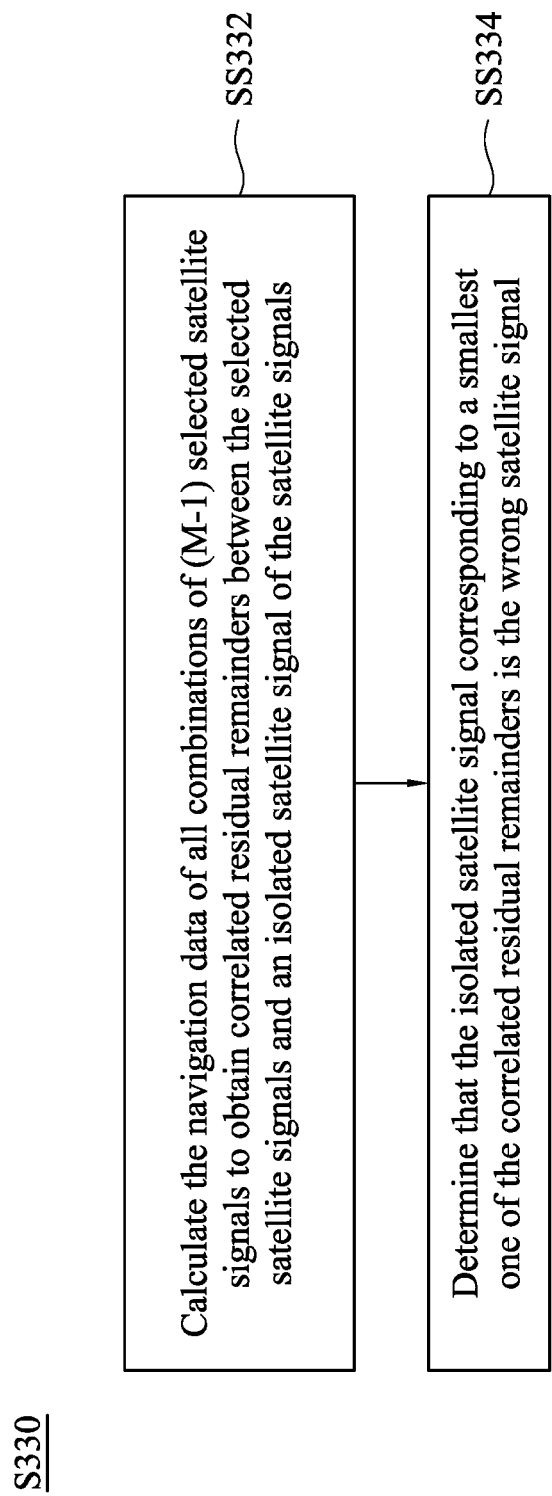
FIG. 5 is a flowchart of another step of the method in FIG. 3.

The detailed description of Step S330 is as follows. In the beginning, as shown in FIG. 5, finding out a wrong satellite signal among the satellite signals in Step S330 includes Substeps SS332 and SS334. Specifically, in Substep SS332, the navigation data of all combinations of (M-1) satellite signals selected from the satellite signals are calculated, so as to respectively obtain correlated residual remainders between the selected satellite signals and an isolated satellite signal of the satellite signals. It is noted that isolated satellite signal is different from the (M-1) selected satellite signals. For example, if the number of acquired satellite signals is 5 (i.e. M=5), for a combination where the satellite signals of the $2^{nd}$ to $5^{th}$ satellites are selected and the satellite signal of the $1^{st}$ satellite is isolated, the positioning coordinate of the device and the time offset between the GNSS and the device corresponding to the combination can be obtained from Equation (1) for m being 2-5 (i.e. for each selected satellite signal). By repeating the positioning coordinate calculation for the other combinations, 5 positioning coordinates and time offsets respectively corresponding to all the combinations are obtained.

The correlated residual is the residual obtained from the equation of the isolated satellite signal into which the solution of the set of equations of the selected satellite signals is inserted. Specifically, the correlated residual $\mathcal{R}[n]$ of the combination of the selected satellite signals of the satellites (excluding the $n^{th}$ satellite) relative to the isolated satellite signal of the $n^{th}$ satellite is defined as $$\mathcal{R}=PR[n]-\sqrt{(x_{\bar{n}}-S_x[n])^2+(y_{\bar{n}}-S_y[n])^2+(z_{\bar{n}}-S_z[n])^2}-cdt_{\bar{n}}+ctb[n],$$

where $(x_{\bar{n}},y_{\bar{n}},z_{\bar{n}})$ is the positioning coordinate of the device obtained corresponding to the equation set of the selected satellite signals of the satellites (excluding the $n^{th}$ satellite), and $cdt_{\bar{n}}$ is the time offset between the device and the GNSS obtained corresponding to the equation set of the selected satellite signals of the satellites (excluding the $n^{th}$ satellite).

By performing the above correlated residual calculation for the all the combinations, the correlated residuals $\mathcal{R}[1]$-$\mathcal{R}[5]$ corresponding to all the combinations are obtained. Because the period of the PRN code is 1 millisecond, each pseudo range error caused by a wrong bit edge is non-zero integral multiple of $c \times 10^{-3}$. Therefore, if one of the correlated residuals $\mathcal{R}[1]$-$\mathcal{R}[5]$ is approximately a non-zero integral multiple of $c \times 10^{-3}$, the satellite signal satellite corresponding to such correlated residual is determined to has a wrong bit edge. For example, if the correlated residual RN is approximately a non-zero integer multiple of $c \times 10^{-3}$ while each of the other correlated residuals $\mathcal{R}[2]$-$\mathcal{R}[5]$ is not, the satellite signal of the 1$^{st}$ satellite corresponding to the correlated residual R[1] is determined to has a wrong bit edge; that is, the satellite signal of the 1$^{st}$ satellite corresponding to the correlated residual $\mathcal{R}[1]$ is determined to be a wrong satellite signal.

For example, in some embodiments, the correlated residuals $\mathcal{R}[1]$-$\mathcal{R}[5]$ are respectively converted into correlated residual remainders $\mathcal{R}_{mod}[1]$-$\mathcal{R}_{mod}[5]$ by the following equation:

$$\mathcal{R}_{mod}[n] = \begin{cases} \left| \mathcal{R}[n] - \text{round}\left(\frac{\mathcal{R}[n]}{c \times 10^{-3}}\right) \times (c \times 10^{-3}) \right|, & \text{round}\left(\frac{\mathcal{R}[n]}{c \times 10^{-3}}\right) \neq 0 \\ \infty, & \text{round}\left(\frac{\mathcal{R}[n]}{c \times 10^{-3}}\right) = 0 \end{cases},$$

where round(•) is a nearest integer function. Subsequently, Substep SS334 is performed to determine whether the isolated satellite signal corresponding to the smallest one of the correlated residual remainders is a wrong satellite signal. Specifically, the smallest value $\mathcal{R}_{mod}$_MIN among $\mathcal{R}_{mod}[1]$-$\mathcal{R}_{mod}[5]$ is compared with a predetermined threshold $\mathcal{R}_{mod}$_TH. If the smallest value $\mathcal{R}_{mod}$_MIN is less than the predetermined threshold $\mathcal{R}_{mod}$_TH, the isolated satellite signal corresponding to the smallest value $\mathcal{R}_{mod}$_MIN may be determined to have a wrong bit edge. The predetermined threshold $\mathcal{R}_{mod}$_TH may be set to 200 meters or another value that is beneficial to distinguish the satellite signal with a wrong bit edge from the others respectively with correct bit edges.

It is noted that the aforementioned step of determining whether there is one of the acquired satellite signals has a wrong bit edge is an example, and those of ordinary skill in the art may derive other modified embodiment according to the above example to achieve the same objectives. Thus, other modifications and variations derived based on the aforementioned example should be understood to fall within the scope of the present disclosure.

After determining that one of the acquired satellite signals has a wrong bit edge, the navigation data of the satellite signal with a wrong bit edge may be ignored, and the navigation data of the other satellite signals are used to perform actual positioning coordinate calculation. Because the satellite signal with a wrong bit edge is ensured not to be involved in calculating the actual positioning coordinate of the device, the device can be correctly and accurately positioned. Moreover, for the embodiments of the present disclosure, the positioning process can be performed as long as the device acquires 5 satellite signals. Even if there exists a wrong bit edge in one of the satellite signals, the satellite signal with such wrong bit edge can still be found out based on the navigation data of these satellite signals, and the navigation data of the other satellite signals can still be used to perform actual positioning coordinate calculation, instead of requiring that all satellite signals are correct to actual positioning coordinate calculation. Therefore, the positioning process of the device can be completed more quickly.

Moreover, if more than one of the acquired satellite signals has a wrong bit edge, at least one of the satellite signals with a wrong bit edge will be used for the equation set of the selected satellite signals excluding the n$^{th}$ satellite signal, and thus the obtained solutions of the time offset and the position have large errors. If the solutions are inserted into the equation of the n$^{th}$ satellite signal to calculate the correlated residual remainder $\mathcal{R}_{mod}[n]$, usually the verification by using the inequality $\mathcal{R}_{mod}[n] < \mathcal{R}_{mod}$TH will not be passed. That is, when more than one of the acquired satellite signals has a wrong bit edge, the aforementioned technique can usually determine that a correct positioning cannot be achieved, even though all the satellite signals with wrong bit edges cannot be determined.

The specific implementation of the positioning device 100 or the method 300 mentioned above can be software and/or hardware. For example, if execution speed and accuracy are the primary considerations, then basically the hardware is chosen (e.g. using a processor or a digital controlling chip) to implement the positioning device 100 or the method 300. The processor can be a central processing unit (CPU), a microprocessor, or other hardware units capable of executing instructions. Oppositely, if design flexibility is the primary consideration, then basically the software is chosen to implement the positioning device 100 or the method 300. For example, the positioning device 100 may be placed in a schedule management tool in a non-transitory computer readable medium, while the method 300 may be compiled into computer program instructions that can be executed by a processor and can be stored in a non-transitory computer readable medium accessible by the processor. The non-transitory computer readable medium can be a read only memory, a flash memory, a floppy disk, a hard disk, a compact disc, an USB flash drive, a magnetic tape, a database capable of being accessed on the internet, or other computer readable media having the same functions that is obvious to those of ordinary skill in the art. Alternatively, a collaboration of software and hardware can be adopted to implement the positioning device 100 or the method 300. Those of ordinary skill in the art can flexibly choose the implementation of software, hardware or combinations thereof according to practical requirements.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A method of positioning a device, the method comprising:
    receiving satellite signals corresponding to at least 5 satellites in a global navigation satellite system (GNSS);
    performing an iterating operation on navigation data of the satellite signals by a least square estimation of the position of the device and a time offset between the GNSS and the device to obtain residuals of an equation of the satellite signals;
    comparing a largest one of the residuals with a predetermined residual threshold;
    determining that one of the satellite signals has a bit synchronization error if the largest one of the residuals is greater than the predetermined residual threshold; and in response to a determination that one of the satellite signals has a bit synchronization error, identifying a corresponding wrong satellite signal among the satellite signals, and using the navigation data of the other satellite signals to obtain a position of the device.

2. The method of claim 1, wherein the iterating operation is stopped if a sum of the residuals is smaller than a predetermined total residual threshold.

3. The method of claim 1, wherein the number of the received satellite signals is 5, and the received satellite signals are provided respectively from 5 satellites.

4. The method of claim 1, wherein identifying a corresponding wrong satellite signal among the satellite signals comprising:
  calculating the navigation data of all combinations of 4 selected satellite signals of the satellite signals to respectively obtain correlated residual remainders corresponding to the selected satellite signals and an isolated satellite signal of the satellite signals; and
  determining that the isolated satellite signal corresponding to a smallest one of the correlated residual remainders is the wrong satellite signal.

5. The method of claim 1, wherein the navigation data of the satellite signals are transmitted via the device to an entity that is communicatively connected to the device.

6. The method of claim 1, wherein the GNSS is a Global Positioning System (GPS) or a GLONASS system.

7. A positioning device, comprising:
  a front end circuit configured to receive satellite signals corresponding to at least 5 satellites in a global navigation satellite system (GNSS); and
  a processor configured to perform the following operations:
    performing an iterating operation on navigation data of the satellite signals by a least square estimation of the position of the device and a time offset between the GNSS and the device to obtain residuals of an equation of the satellite signals;
    comparing a largest one of the residuals with a predetermined residual threshold;
    determining that one of the satellite signals has a bit synchronization error if the largest one of the residuals is larger than the predetermined residual threshold; and
    in response to a determination that one of the satellite signals has a bit synchronization error, identifying a corresponding wrong satellite signal among the satellite signals, and using the navigation data of the other satellite signals to obtain a position of the device.

8. The positioning device of claim 7, wherein the processor stops the iterating operation if a sum of residuals is smaller than a predetermined total residual threshold.

9. The positioning device of claim 7, wherein the number of the received satellite signals is 5, and the received satellite signals are provided respectively from 5 satellites.

10. The positioning device of claim 9, wherein the processor is configured to perform the following operations in the operation of identifying a corresponding wrong satellite signal among the satellite signals:
  calculating the navigation data of all combinations of 4 selected satellite signals of the satellite signals to respectively obtain correlated residual remainders corresponding to the selected satellite signals and an isolated satellite signal of the satellite signals; and
  determining that the isolated satellite signal corresponding to a smallest one of the correlated residual remainders is the wrong satellite signal.

11. The positioning device of claim 7, wherein the GNSS is a Global Positioning System (GPS) or a GLONASS system.

12. A non-transitory computer readable medium storing computer program instructions that, when executed by a processor, cause the processor to perform the following operations for positioning of a device:
  obtaining navigation data respectively from satellite signals of at least 5 satellites in a global navigation satellite system (GNSS);
  performing an iterating operation on the navigation data of the satellite signals by a least square estimation of the position of the device and a time offset between the GNSS and the device to obtain residuals of an equation of the satellite signals;
  comparing a largest one of the residuals with a predetermined residual threshold;
  determining that one of the satellite signals has a bit synchronization error if the largest one of the residuals is larger than the predetermined residual threshold; and
  in response to a determination that one of the satellite signals has a bit synchronization error, identifying a corresponding wrong satellite signal among the satellite signals, and using the navigation data of the other satellite signals to obtain a position of the device.

13. The non-transitory computer readable medium of claim 12, wherein the iterating operation is stopped if a sum of residuals is smaller than a predetermined total residual threshold.

14. The non-transitory computer readable medium of claim 12, wherein the number of the received satellite signals is 5, and the received satellite signals are provided respectively from 5 satellites.

15. The non-transitory computer readable medium of claim 14, wherein the operation of identifying a corresponding wrong satellite signal among the satellite signals comprising:
  calculating the navigation data of all combinations of 4 selected satellite signals of the satellite signals to obtain correlated residual remainders between the selected satellite signals and an isolated satellite signal of the satellite signals; and
  determining that the isolated satellite signal corresponding to a smallest one of the correlated residual remainders is the wrong satellite signal.

16. The non-transitory computer readable medium of claim 12, wherein the GNSS is a Global Positioning System (GPS) or a GLONASS system.

17. The non-transitory computer readable medium of claim 12, wherein the processor is a central processing unit (CPU) applied to the device.

* * * * *